Jan. 1, 1935.     A. J. MEYER     1,985,944
ENGINE
Filed Oct. 24, 1931
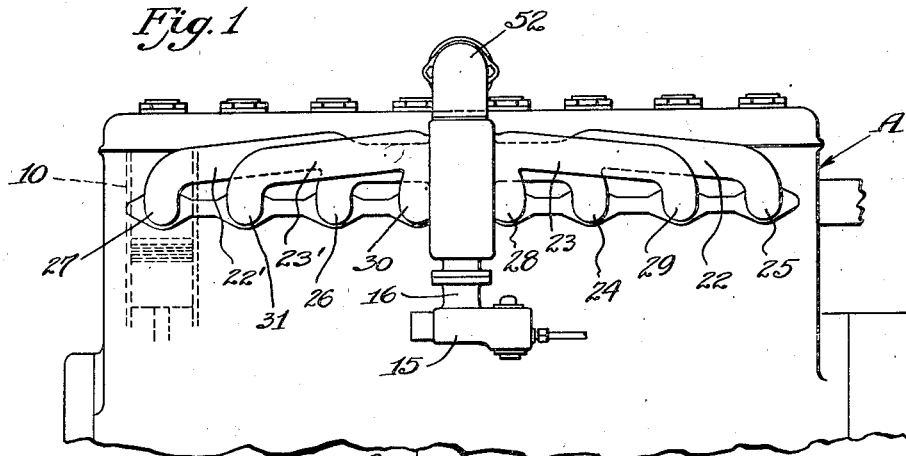
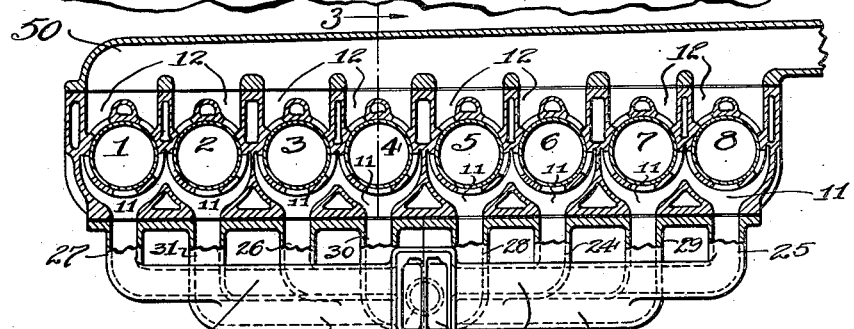
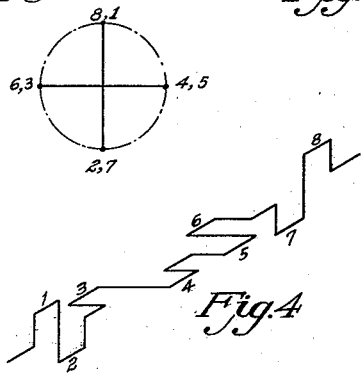
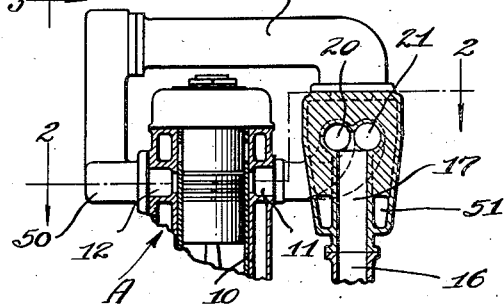
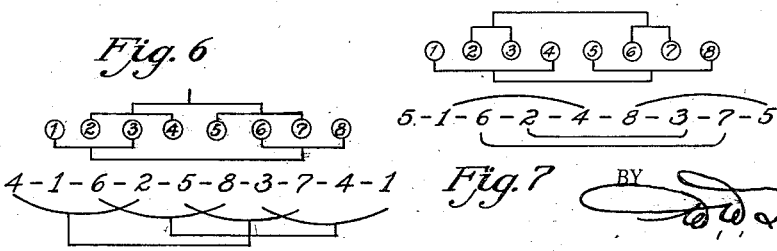
INVENTOR.
Andre J. Meyer
BY
ATTORNEY.

Patented Jan. 1, 1935

1,985,944

UNITED STATES PATENT OFFICE 1,985,944

ENGINE

Andre J. Meyer, Detroit, Mich., assignor to Continental Motors Corporation, Detroit, Mich., a corporation of Virginia Application October 24, 1931, Serial No. 570,783

24 Claims. (Cl. 123—52)

My invention relates to engines and more particularly to an intake manifold structure therefor.

An object of my invention is to provide a fuel mixture supply structure for an engine whereby substantially uniform distribution may be obtained of the fuel mixture to the various engine cylinders.

Another object of my invention is to provide an intake manifold structure for a multi-cylinder engine providing for improved engine performance by constructing a manifold structure with branches cooperating with the various engine cylinders and so constructed and arranged in cooperation with the engine crankshaft that the intake period of the cylinders connected with the same branch do not overlap, the intake openings of the cylinders being spaced apart by 270° and 450° of the crankshaft rotation.

A further object of my invention is to construct a fuel mixture distributing structure or manifold for an engine having more than seven cylinders by providing a structure including a plurality of fuel mixture conducting portions consisting of branches each of which are connected with a pair of cylinders, and so constructed and arranged in cooperation with the engine crankshaft that an interval of substantially 270 degrees of crankshaft rotation occurs between an intake opening of one cylinder of each of said branches and the following intake opening of the other cylinder of the same branch.

A still further object of my invention is to provide an improved fuel mixture distributing structure cooperating with a prearranged grouping of the engine cylinders whereby to effect an improved engine performance.

For a more detailed understanding of my invention reference may be had to the accompanying drawing illustrating preferred embodiments of my invention and in which:

Fig. 1 is a side elevation of an engine having assembled therewith a fuel mixture supply manifold constructed in accordance with my invention, Fig. 2 is a horizontal fragmentary plan sectional view through the manifold structure as illustrated in Fig. 1 and taken substantially on the line 2—2 of Fig. 3, Fig. 3 is a transverse sectional view thereof taken substantially on the line 3—3 of Fig. 2, Fig. 4 is a diagrammatic perspective illustration of the crankshaft, Fig. 5 is a diagrammatic view illustrating the crankshaft throw diagram, Fig. 6 is a diagrammatic showing of the firing order and the spacing of the cyclical events of the engine, and Fig. 7 is a diagrammatic showing of the firing order and the spacing of the cyclical events of a modified engine construction.

A designates an engine having a plurality of cylinders 10 and intake and exhaust ports 11 and 12 respectively. For purposes of illustration I have chosen to show my invention as incorporated with an engine having eight cylinders in line respectively numbered as shown in Figs. 2 and 6 from 1 to 8 inclusive. Obviously the broader aspects of my invention need not be limited to an engine of the type herein illustrated in which I have preferably provided a crankshaft of the 2—4—2 type which as illustrated in Fig. 4 shows cranks 1 and 2 in a plane parallel with the plane containing cranks 7 and 8 while cranks 3, 4, 5 and 6 are contained in a plane extending at right angles to the plane containing the cranks 1, 2, 7 and 8.

It will be noted by observing Figs. 4 to 6 inclusive that the successive cyclical events of two cylinders of the engine connected with the same branch and controlled by the crankshaft as herein illustrated are spaced apart 270° and 450° of the crankshaft rotation. Obviously other types of crankshaft may be employed and I do not specifically limit my invention to a crankshaft as herein illustrated, as I have merely chosen to illustrate a crankshaft of this type since my invention is well adapted for use with a 2—4—2 crankshaft which can be very readily balanced. In other words, the cylinders are so arranged in cooperation with the engine crankshaft whereby successive spacings or intervals between the firing of any two cylinders connected with the same branch are respectively substantially 270° and 450° of the crankshaft rotation. For example, specifically referring to Fig. 6 of the drawing it will be noted that cylinders 1 and 3 are respectively connected with branch 22', and the engine has a firing order of 1—6—2—5—8—3—7—4—1. It will be noted that cylinder 3 is fired after cylinder 1, the interval being substantially 450° of crankshaft rotation, the cylinders numbered 6, 2, 5 and 8 being fired respectively 90° apart during this interval of 450°. Cylinder 1 is next fired 270° of crankshaft rotation after the firing of cylinder 3, the cylinders numbered respectively 7 and 4 being fired respectively 90° apart during this interval of 270°. The cycle is then repeated, the successive spacing between the firing of cylinders 1 and 3 alternating between 270° and 450° as will be evident from an examination of Figs. 5 and 6. It will be noted that the above relation is of particular significance with an eight cylinder engine, and is obviously of particular advantage with an eight cylinder in line engine, but I do not limit my invention to this particular application, since the principles of my invention may be incorporated in engines other than those of the eight cylinder type and in engines other than those of the type having aligned cylinders.

The intake manifold structure includes fuel mixture distributing chamber means consisting of portions 20 and 21 respectively arranged in such a manner as to be adapted for direct communication with pairs of fuel mixture conducting branch portions 22, 22' and 23, 23'. The branch portion 22 communicates with port runner portions 24, 25 respectively connected with cylinders 6 and 8 and branch portion 22' communicates with port portions 26, 27 respectively connected with the cylinders 1 and 3. Branch portion 23 communicates with port runners 28, 29 respectively connected with cylinders 5 and 7 and branch portion 23' communicates with port runners 30, 31 respectively connected with cylinders 2 and 4. The branches of the intake manifold structure cooperate with the engine cylinders and are so constructed that the intake opening of the cylinders connected to the same branch are spaced apart by 270° of the crankshaft rotation. Thus, cylinders 1, 3 and 6, 8 are respectively connected by port runners 27, 26 and 24, 25 with the branches 22', 22 communicating with the fuel mixture distributing chamber means, said branches preferably extending in opposite directions with respect to the portion 20 of the fuel mixture distributing chamber means. Likewise cylinders 2, 4 and 5, 7 are respectively connected by the port runners 31, 30 and 28, 29 with the branches 23', 23, said branches 23 and 23' preferably communicating with and extending in opposite directions with respect to portion 21 of the fuel mixture distributing chamber means.

Thus it will be seen that each branch connects the fuel mixture distributing chamber portion associated therewith to a pair of the engine cylinders. These manifold branches preferably extend longitudinally of the engine for the most part and are arranged substantially parallel to each other. More particularly the branches extend longitudinally of the engine but the port runner portions are positioned substantially at right angles thereto to conduct the fuel mixture to the intake ports respectively associated with the cylinders 1 to 8 inclusive. The branches 22, 22' and 23, 23' respectively form fuel mixture conducting portions, each conducting portion communicating with the fuel mixture distributing chamber means.

It may be further noted that the distributing chamber means portion 21 is located further from the central longitudinal plane of the engine than the chamber means portion 20 and the branches 23, 23' communicating with the chamber means portion 21 are thus preferably arranged with port runner portions that are adapted to cross under the branches 22, 22' in a manner substantially as illustrated in Fig. 2.

In Fig. 3 I have illustrated by intake manifold structure assembled with a single tube carburetor 15, the carburetor tube being indicated by reference numeral 16. The carburetor is connected to the manifold riser 17, which communicates with both portions 20 and 21 of the fuel mixture distributing chambers means.

The exhaust gases of the engine may be conducted through the exhaust manifold 50 and some of the exhaust gases may be conducted through the jacket portion 51 of the intake manifold structure, a suitable cross-over 52 being preferably employed for conducting the exhaust gases to the jacket portion 51. However, the particular means by which the exhaust gases are conducted in heat relation with the intake manifold structure forms no part of my present invention and the same may be constructed in any suitable manner to obtain the desired results.

It will thus be noted that I have provided an engine having generally improved operating characteristics because of the novel manifold structure assembled therewith which is so constructed and arranged in cooperation with the engine crankshaft and cylinders that the cyclical events of the engine are so spaced as to have no overlapping of the intake period of cylinders which are connected to the same branch, and preferably the firing of cylinders connected to the same branch are spaced apart by 270° and 450° of the crankshaft rotation, thereby eliminating any overlapping of the intake cyclical event of any engine cylinder with respect to the intake cyclical event of another cylinder connected with the same branch.

My arrangement is especially useful with an engine in which the intake cyclical event is more than 180° of crankshaft rotation, an intake event of this duration being quite customary. Thus the surging of the fuel mixture in any of the branches caused by the intake of the fuel mixture into an engine cylinder does not effect the proper induction of fuel mixture to the other cylinder connected with the same branch.

In the present illustrated embodiment of my invention, I have provided a pair of fuel mixture conducting portions each communicating with a group of four cylinders, each of said conducting portions consisting of a pair of branches and each branch connected with a pair of engine cylinders by reason of a pair of port runners, each of which is connected with a cylinder. It will thus be noted that each group of four cylinders are grouped together in separate fuel mixture distributing systems, each system including branches communicating with fuel mixture distributing chamber means. The construction illustrated in Figs. 2 and 6 provides a pair of conducting portions respectively formed of branches 22, 22' and 23, 23'. One conducting portion is connected with cylinders 1, 3, 6, 8, while the other conducting portion a group of cylinders numbered 2, 3, 5, and 7.

In Fig. 7 I have illustrated a modified construction of engine preferably employing the same type of crankshaft but having a different firing order and a modified cylinder arrangement. This modified arrangement provides branches cooperating with the engine cylinders and so constructed and arranged that the intake opening of the cylinders connected to the same branch are spaced apart by 270° and 450° of the crankshaft rotation in a manner fundamentally similar to the arrangement illustrated by the construction shown in Figs. 1 to 6 inclusive.

It will be apparent to those skilled in the art to which my invention pertains that various modifications and changes may be made therein without departing from the spirit of my invention or from the scope of the appended claims.

What I claim as my invention is:

1. An intake manifold structure for an engine having cylinders in line arranged in two groups of four cylinders, the two outside cylinders of one group arranged intermediate the two outside cylinders and inside cylinders of the other group, said intake manifold structure including fuel mixture distributing chamber means and manifold branches for connecting said chamber means with the cylinders, and means for supplying fuel mixture to said fuel mixture distributing chamber means.

2. An intake manifold structure for an engine having cylinders in line arranged in two groups of four cylinders, the outside cylinders of one group arranged adjacent to and outside the outside cylinders of the other group, said intake manifold structure including fuel mixture distributing chamber means and manifold branches for connecting said chamber means with the cylinders, and means for supplying fuel mixture to said fuel mixture distributing chamber means.

3. An intake manifold structure for an engine having eight cylinders in line and arranged in two groups of four cylinders, one group comprising cylinders 1, 3, 6 and 8 and the other group comprising cylinders 2, 4, 5 and 7, said intake manifold structure comprising separate fuel mixture distributing systems for each group and each including branches, fuel mixture distributing chamber means for said branches, and means for supplying fuel mixture to said fuel mixture distributing chamber means.

4. An intake manifold structure for an engine having eight cylinders in line and arranged in two groups of four cylinders, one group comprising cylinders 1, 4, 5 and 8 and the other group comprising cylinders 2, 3, 6 and 7, said intake manifold structure comprising separate fuel mixture distributing systems for each group and each including branches, fuel mixture distributing chamber means for said branches, and means for supplying fuel mixture to said fuel mixture distributing chamber means.

5. Intake manifolding for an engine having eight longitudinally arranged cylinders, said manifolding having fuel mixture conducting portions for respectively conducting fuel mixture to two groups of four cylinders each, one group comprising cylinders 1, 3, 6 and 8 and the other group comprising cylinders 2, 4, 5 and 7, and means for supplying fuel mixture to said conducting portions.

6. Intake manifolding for an engine having eight longitudinally arranged cylinders, said manifolding having fuel mixture conducting portions for respectively conductng fuel mixture to two groups of four cylinders each, one group comprising cylinders 1, 3, 6 and 8 and the other group comprising cylinders 2, 4, 5 and 7, and a common fuel mixture supply conduit for said conducting portions.

7. Intake manifolding for an engine having eight longitudinally arranged cylinders, said manifolding having fuel mixture conducting portions for respectively conducting fuel mixture to two groups of four cylinders each, one group comprising cylinders 1, 4, 5 and 8, and the other group comprising cylinders 2, 3, 6 and 7.

8. Intake manifolding for an engine having eight longitudinally arranged cylinders, said manifolding having fuel mixture conducting portions for respectively conducting fuel mixture to two groups of four cylinders each, one group comprising cylinders 1, 4, 5 and 8, and the other group comprising cylinders 2, 3, 6 and 7, and a common fuel mixture supply conduit for said conducting portions.

9. In a multi-cylinder engine of the eight cylinder type, a crankshaft having at least an end pair of adjacent cranks located in a common plane, an intake manifold structure including a plurality of fuel mixture conducting branches, each branch communicating with a pair of engine cylinders, said manifold structure being constructed and arranged for cooperation with the crankshaft so that an interval of 270 degrees of crankshaft rotation occurs between an intake opening of one cylinder of each of said branches and the following intake opening of the other cylinder of the same branch.

10. In a multi-cylinder engine of the eight cylinder type, a crankshaft of the 2—4—2 type, an intake manifold structure including fuel mixture distributing chamber means, and a plurality of fuel mixture conducting branches communicating with said distributing chamber means, said manifold structure being constructed and arranged in cooperation with the crankshaft so that an interval of 270 degrees of crankshaft rotation occurs between an intake opening of one cylinder of each of said branches and the following intake opening of the other cylinder of the same branch.

11. In a multi-cylinder engine of the eight cylinder type, a crankshaft of the 2—4—2 type, an intake manifold structure including fuel mixture distributing chamber means, a plurality of fuel mixture conducting branches communicating with said distributing chamber means, and a pair of port runners connected with each of said branches, each port runner terminating in outlets each connected with an engine cylinder, said manifold structure being constructed and arranged in cooperation with the crankshaft so that an interval of 270 degrees of crankshaft rotation occurs between an intake opening of one cylinder of each of said branches and the following intake opening of the other cylinder of the same branch.

12. In a multi-cylinder engine of the eight cylinder type, a crankshaft of the 2—4—2 type, an intake manifold structure including fuel mixture distributing chamber means, a plurality of oppositely extending fuel mixture conducting branches communicating with said distributing chamber means, and a pair of port runners connected with each of said branches, each port runner terminating in outlets each connected with an engine cylinder, said manifold structure being constructed and arranged in cooperation with the crankshaft so that an interval of 270 degrees of crankshaft rotation occurs between an intake opening of one cylinder of each of said branches and the following intake opening of the other cylinder of the same branch.

13. In an eight cylinder in line engine, a two-four-two crankshaft, an intake manifold structure including a plurality of fuel mixture conducting branches, each branch communicating with a pair of engine cylinders, said manifold structure cooperating with said crankshaft and arranged so that an interval of 270 degrees of crankshaft rotation occurs between an intake opening of one cylinder of each of said branches and the following intake opening of the other cylinder of the same branch.

14. In an engine having eight cylinders in line, a crankshaft of the 2—4—2 type, an intake manifold structure having a pair of manifold fuel mixture conducting portions communicating respectively with a group of four of said cylinders, said conducting portions each consisting of a pair of fuel mixture conducting branches each connected with a pair of engine cylinders, said manifold structure arranged in cooperation with the crankshaft whereby successive intervals between the firing of said pair of cylinders connected with the same branch are respectively substantially 270° and 450° of crankshaft rotation.

15. In an engine having eight cylinders in line, a crankshaft having at least an end pair of adjacent cranks disposed in a common plane and at least a pair of adjacent cranks at its other end also located in a common plane, an intake manifold structure including a plurality of fuel mixture conducting branches each communicating respectively with a pair of said cylinders and arranged in ccoperation with the crankshaft whereby successive spacings between the firing of the cylinders connected with the same branch are respectively substantially 270 degrees and 450 degrees of crankshaft rotation.

16. An intake manifold structure for an engine having eight cylinders in line, a pair of fuel mixture conducting portions each communicating respectively with a group of four cylinders, each of said fuel mixture conducting portions consisting of a pair of branches, each branch communicating with a pair of engine cylinders, said manifold structure being so constructed and arranged in cooperation with the engine crankshaft that successive intervals of 270 degrees and 450 degrees of crankshaft rotation occur between a firing of one cylinder of each of said branches and the firing of the other cylinder of the same branch, one of said fuel mixture conducting portions communicating with the first, third, sixth and eighth of said cylinders and the other of said fuel mixture conducting portions communicating with the remaining cylinders.

17. An intake manifold structure for an engine having eight cylinders in line, a pair of fuel mixture conducting portions each communicating respectively with a group of four cylinders, each of said fuel mixture conducting portions consisting of a pair of branches, each branch communicating with a pair of engine cylinders, said manifold structure being so constructed and arranged in cooperation with the engine crankshaft that successive intervals of 270 degrees and 450 degrees of crankshaft rotation occur between a firing of one cylinder of each of said branches and the firing of the other cylinder of the same branch, one of said fuel mixture conducting portions communicating with the first, third, sixth and eighth of said cylinders and the other of said fuel mixture conducting portions communicating with the remaining cylinders, said cylinders having a firing order of 1—6—2—5—8—3—7—4.

18. An intake manifold structure for an engine having eight cylinders in line, a pair of fuel mixture conducting portions each communicating respectively with a group of four cylinders, each of said fuel mixture conducting portions consisting of a pair of branches, each branch communicating with a pair of engine cylinders, said manifold structure being so constructed and arranged in cooperation with the engine crankshaft that successive intervals of 270 degrees and 450 degrees of crankshaft rotation occur between a firing of one cylinder of each of said branches and the firing of the other cylinder of the same branch, one of said fuel mixture conducting portions communicating with the first, third, sixth and eighth of said cylinders and the other of said fuel mixture conducting portions communicating with the remaining cylinders, said crankshaft being of the 2—4—2 type.

19. An intake manifold structure for an engine having eight cylinders in line, a pair of fuel mixture conducting portions each communicating respectively with a group of four cylinders, each of said fuel mixture conducting portions consisting of a pair of branches, each branch communicating with a pair of engine cylinders, said manifold structure being so constructed and arranged in cooperation with the engine crankshaft that successive intervals of 270 degrees and 450 degrees of crankshaft rotation occur between a firing of one cylinder of each of said branches and the firing of the other cylinder of the same branch, one of said fuel mixture conducting portions communicating with the first, fourth, fifth and eighth of said cylinders, and the other of said fuel mixture conducting portions communicating with the remaining cylinders.

20. An intake manifold structure for an engine having eight cylinders in line, a pair of fuel mixture conducting portions each communicating respectively with a group of four cylinders, each of said fuel mixture conducting portions consisting of a pair of branches, each branch communicating with a pair of engine cylinders, said manifold structure being so constructed and arranged in cooperation with the engine crankshaft that successive intervals of 270 degrees and 450 degrees of crankshaft rotation occur between a firing of one cylinder of each of said branches and the firing of the other cylinder of the same branch, one of said fuel mixture conducting portions communicating with the first, fourth, fifth and eighth of said cylinders, and the other of said fuel mixture conducting portions communicating with the remaining cylinders, said cylinders having a firing order of 1—6—2—4—8—3—7—5.

21. An intake manifold structure for an engine having eight cylinders in line, a pair of fuel mixture conducting portions each communicating respectively with a group of four cylinders, each of said fuel mixture conducting portions consisting of a pair of branches, each branch communicating with a pair of engine cylinders, said manifold structure being so constructed and arranged in cooperation with the engine crankshaft that successive intervals of 270 degrees and 450 degrees of crankshaft rotation occur between a firing of one cylinder of each of said branches and the firing of the other cylinder of the same branch, one of said fuel mixture conducting portions communicating with the first, fourth, fifth and eighth of said cylinders, and the other of said fuel mixture conducting portions communicating with the remaining cylinders, said crankshaft being of the 2—4—2 type.

22. An intake manifold structure for an engine having eight cylinders in line, a pair of fuel mixture conducting portions each communicating respectively with a group of four cylinders, each of said fuel mixture conducting portions consisting of a pair of branches, each branch communicating with a pair of engine cylinders, said manifold structure being so constructed and arranged in cooperation with the engine crankshaft that successive intervals of 270 degrees and 450 degrees of crankshaft rotation occur between a firing of one cylinder of each of said branches and the firing of the other cylinder of the same branch, one of said fuel mixture conducting portions communicating with the first, fourth, fifth and eighth of said cylinders, and the other of said fuel mixture conducting portion communicating with the remaining cylinders, said cylinders having a firing order of 1—6—2—4—8—3—7—5, said crankshaft being of the 2—4—2 type.

23. In an eight cylinder internal combustion engine, a crankshaft having at least an end pair of adjacent cranks disposed in a common plane and at least a pair of adjacent cranks at its other end also located in a common plane, an intake manifold structure including a plurality of fuel mixture conducting branches, fuel mixture distributing chamber means, each branch having only one inlet to said chamber means, each branch being connected with a pair of engine cylinders and arranged for cooperative operation with the engine crankshaft, whereby the intake openings of the cylinders connected with the same branch are spaced apart not less than substantially 270 degrees of the crankshaft rotation, and means for supplying fuel mixture to said chamber means.

24. In a multi-cylinder engine having more than seven cylinders, a crankshaft of the 2—4—2 type, an intake manifold structure including a plurality of fuel mixture conducting substantially parallel branches extending longitudinally of the engine, said branches each connected with a pair of engine cylinders, said manifold structure constructed and arranged for cooperation with the crankshaft so that the intake openings of the cylinders connected to the same branch are spaced apart by 270 degrees of the crankshaft rotation.

ANDRE J. MEYER.